UNITED STATES PATENT OFFICE.

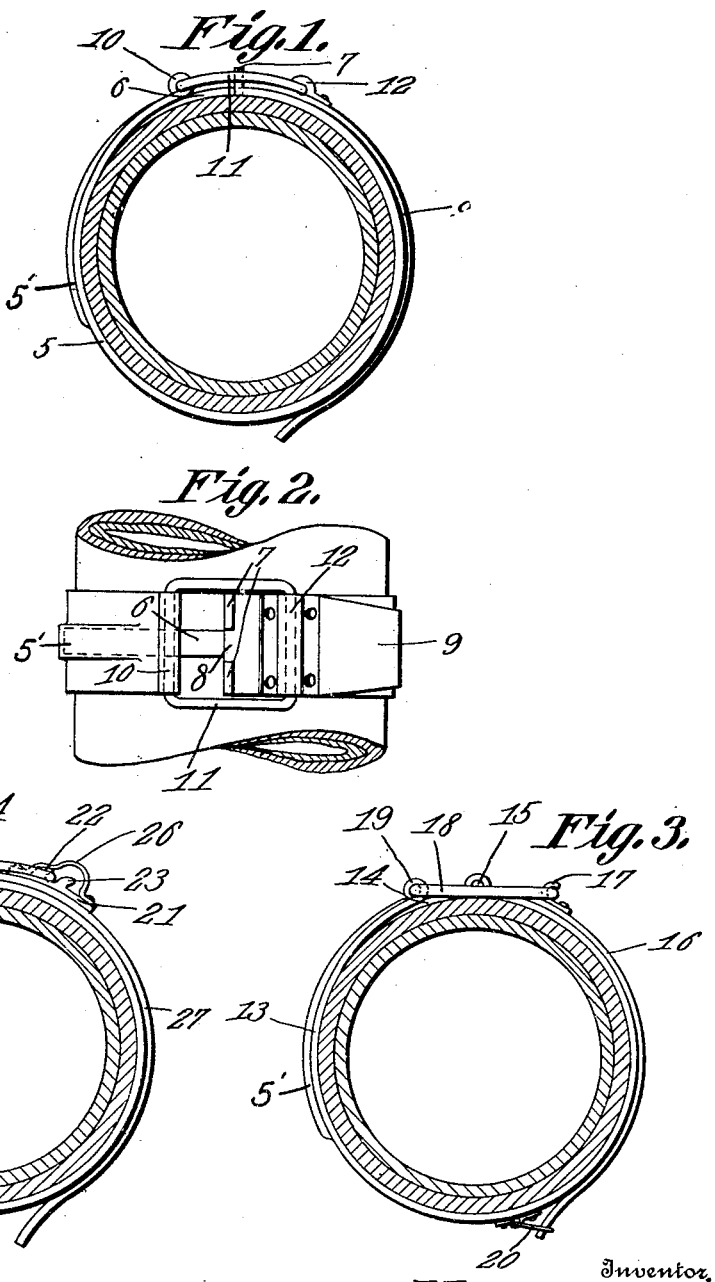

JOSEPH L. THOMPSON, OF CENTERVILLE, IOWA.

HOSE-CLAMP.

1,371,274. Specification of Letters Patent. Patented Mar. 15, 1921.

Application filed October 12, 1920. Serial No. 416,374.

*To all whom it may concern:*

Be it known that I, JOSEPH L. THOMPSON, a citizen of the United States, residing at Centerville, in the county of Appanoose and State of Iowa, have invented a new and useful Hose-Clamp, of which the following is a specification.

This invention relates to hose clamps, and more particularly to a hose clamp of the removable type, and one which may be readily and easily applied or disconnected from a hose.

The primary object of the invention is to provide a clamp of this character which will securely clamp a hose into engagement with the pipe or connection to which the same is to be applied.

A further object of the invention is to provide a novel form of hose clamp which may be disconnected from the hose by opening one side thereof, thereby eliminating the necessity of tearing or cutting the hose, to release the clamp.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a sectional view through a hose and pipe, showing the clamp in side elevation.

Fig. 2 illustrates a fragmental plan view of the clamp as applied.

Fig. 3 illustrates a sectional view through a hose and pipe showing a modified form of clamp in side elevation.

Fig. 4 illustrates a sectional view through a hose and pipe, showing another form of hose clamp in side elevation.

Referring to the drawing in detail, the clamp includes a curved body portion 5 formed preferably of resilient sheet metal and having a tongue 6 formed integral therewith, the width of the tongue being less than the width of the body portion 5, and is designed to underlie one portion of the body portion 5, there being provided a recessed portion 5′ formed in the underside of the body portion 5 to accommodate the tongue 6, preventing lateral movement of the tongue, and at the same time allowing the tongue to lie flush with the inner surface of the body portion 5, so that the clamp will not injure the hose clamped thereby.

Formed integral with the body portion 5 at a point adjacent to the base of the tongue 6, are the upstanding lugs 7 which are spaced apart as indicated more clearly by Fig. 2 of the drawings, the space between the lugs being sufficient to accommodate the extension 8 formed on one end of the operating lever 9, which is also curved to conform to the contour of the body 5 of the hose clamp. Thus it will be seen that when the operating lever 9 is moved to its locking position, the lever will lie close to the body portion 5.

One extremity of the body portion 5 is turned upwardly and outwardly as at 10 to provide a bearing for the connecting link 11, which connecting link is also connected to the operating lever 9 as by means of the cleat 12, which is secured to the operating lever.

From the foregoing it is obvious that when the lever is moved upwardly to disengage the lugs 7, the body portion 5 expands to permit the same to be positioned over a hose, and when the lever is moved downwardly as indicated by Fig. 1 of the drawing, the ends of the body portion are moved toward each other in clamping engagement with the hose to be clamped thereby.

In the modified form of the invention, as illustrated by Fig. 3 of the drawing, the body portion 13 is also in the form of a split ring having a tongue 14 engaging under one surface of the body, there being provided a pivot pin 15 on one end of the body, which pin provides a bearing for the operating lever 16, which operating lever supports a keeper 17 designed to accommodate the connecting link 18, which has one extremity thereof pivotally connected to the opposite side of the body 13, as indicated at 19.

In this form of the invention when it is desired to clamp a hose, it is obvious that the link member 18 is moved over the keeper 17, whereupon the lever 16 is depressed to closely engage the side wall of the keeper. It is further noted that a pivoted keeper 20 is carried by the body portion and swings upwardly over the free end of the operating lever 16 to hold the operating lever against movement.

With reference to Fig. 4 of the drawing, this modified form of the invention is substantially the same as that shown by Figs. 1 and 3 of the drawing, with the exception that the keeper 21 is relatively long and includes a pair of hook members 22 and 23, which hook members are disposed in spaced relation with each other to provide an adjustment of the clamp, so that the clamp may be used for clamping various sized hose.

As shown, the link 24 is pivotally carried by one end of the body portion 25, the opposite end of the link being disposed over one of the hook members, whereby the sections of the body portion 25 may be moved to clamping positions.

A guard 26 is secured to the controlling lever 27 and overlies the hook members 22 and 23 to prevent displacement of the link 24 from the hook members 22 and 23, while the device is in use.

Having thus described the invention, what is claimed as new is:—

A hose clamp including a split resilient body portion, one end of said body portion having upstanding lugs disposed in spaced relation with each other, a link pivotally connected to the opposite end of the body portion, an operating lever having an extension disposed between the lugs, said body portion having a recessed portion, a tongue extending from the opposite end of the body and adapted to move in the recess portion, and means carried by the locking lever and adapted to coöperate with the link for moving the ends of the body portion with respect to each other.

In testimony that I claim the foregoing as my own, I have hereto affixed my signature in the presence of two witnesses.

JOSEPH L. THOMPSON.

Witnesses:
  JAY GREEN,
  L. L. BROUGH.